(12) United States Patent
Howell et al.

(10) Patent No.: US 7,697,729 B2
(45) Date of Patent: Apr. 13, 2010

(54) SYSTEM FOR AND METHOD OF FINGER INITIATED ACTIONS

(75) Inventors: Mark J. Howell, Glendale, AZ (US); Anthony P. Russo, New York, NY (US); Marcia Tsuchiya, Fremont, CA (US); Frank H. Chen, San Jose, CA (US)

(73) Assignee: AuthenTec, Inc., Melbourne, FL (US)

( * ) Notice: Subject to any disclaimer, the term of this patent is extended or adjusted under 35 U.S.C. 154(b) by 563 days.

(21) Appl. No.: 10/882,787

(22) Filed: Jun. 30, 2004

(65) Prior Publication Data

US 2005/0169503 A1    Aug. 4, 2005

Related U.S. Application Data

(60) Provisional application No. 60/540,950, filed on Jan. 29, 2004.

(51) Int. Cl.
*G06K 9/20* (2006.01)

(52) U.S. Cl. .................. 382/115; 382/124; 382/107; 382/312; 382/232; 345/174; 345/173; 345/156; 713/202; 713/186

(58) Field of Classification Search .......... 382/107, 382/115, 124, 312, 232; 345/174, 173, 156, 345/143, 157; 713/202, 186; 250/221; 235/492
See application file for complete search history.

(56) References Cited

U.S. PATENT DOCUMENTS

| | | | |
|---|---|---|---|
| 4,827,527 A | 5/1989 | Morita et al. | 382/4 |
| 5,283,735 A | 2/1994 | Gross et al. | 364/413.02 |
| 5,327,161 A | 7/1994 | Logan et al. | 345/157 |
| 5,610,993 A | 3/1997 | Yamamoto | 382/124 |
| 5,612,719 A | 3/1997 | Beemink et al. | 345/173 |
| 5,657,012 A | 8/1997 | Tait | 341/20 |
| 5,666,113 A | 9/1997 | Logan | 341/34 |

(Continued)

FOREIGN PATENT DOCUMENTS

EP    0973123 A    1/2000

(Continued)

OTHER PUBLICATIONS

"Fingernail Touch Sensors: Spatially Distributed Measurement and Hemodynamic Modeling", Stephen Mascaro and H. Harry Asada, 2000 IEEE, pp. 3422-3427.

(Continued)

*Primary Examiner*—Samir A. Ahmed
*Assistant Examiner*—Ali Bayat
(74) *Attorney, Agent, or Firm*—Allen, Dyer, Doppelt, Milbrath & Gilchrist, P.A.

(57) ABSTRACT

A device for and method of performing a task associated with fingerprint data is disclosed. The method comprises reading fingerprint data, matching the read fingerprint data to stored fingerprint data, the stored fingerprint data having an associated task, and performing the task. The associated task is part of a chain of tasks that are automatically executed when the read fingerprint data is matched to the stored fingerprint data. Preferably, at least one task has associated user profile data that is used to perform the task. An electronic device that can be controlled in accordance with the present invention includes, but is not limited to, a telephone, a personal computer, a personal digital assistant, and a remote controlled device.

13 Claims, 10 Drawing Sheets

U.S. PATENT DOCUMENTS

| | | | |
|---|---|---|---|
| 5,689,285 A | 11/1997 | Asher | 345/161 |
| 5,740,276 A | 4/1998 | Tomko et al. | 382/210 |
| 5,821,930 A | 10/1998 | Hansen | 345/340 |
| 5,825,352 A | 10/1998 | Bisset et al. | 345/173 |
| 5,825,907 A | 10/1998 | Russo | 382/124 |
| 5,828,773 A | 10/1998 | Setlak et al. | |
| 5,841,888 A | 11/1998 | Setlak et al. | |
| 5,845,005 A | 12/1998 | Setlak et al. | |
| 5,852,670 A | 12/1998 | Setlak et al. | |
| 5,862,248 A | 1/1999 | Salatino et al. | |
| 5,880,411 A | 3/1999 | Gillespie et al. | 178/18.01 |
| 5,903,225 A | 5/1999 | Schmitt et al. | |
| 5,907,327 A | 5/1999 | Ogura et al. | 345/339 |
| 5,909,211 A | 6/1999 | Combs et al. | 345/172 |
| 5,910,286 A | 6/1999 | Lipskier | |
| 5,920,640 A | 7/1999 | Salatino et al. | |
| 5,940,526 A | 8/1999 | Setlak et al. | |
| 5,943,052 A | 8/1999 | Allen et al. | 345/341 |
| 5,953,441 A | 9/1999 | Setlak | |
| 5,956,415 A | 9/1999 | McCalley et al. | |
| 5,963,679 A | 10/1999 | Setlak | |
| 5,982,894 A | 11/1999 | McCalley et al. | |
| 5,995,084 A | 11/1999 | Chan et al. | 345/173 |
| 5,995,623 A | 11/1999 | Kawano et al. | 380/21 |
| 5,995,630 A | 11/1999 | Borza | 380/54 |
| 6,011,589 A | 1/2000 | Matsuura et al. | |
| 6,011,849 A | 1/2000 | Orrin | 380/42 |
| 6,021,211 A | 2/2000 | Setlak et al. | |
| 6,028,773 A | 2/2000 | Hundt | |
| 6,035,398 A | 3/2000 | Bjorn | 713/186 |
| 6,047,281 A | 4/2000 | Wilson et al. | |
| 6,047,282 A | 4/2000 | Wilson et al. | |
| 6,057,540 A | 5/2000 | Gordon et al. | |
| 6,057,830 A | 5/2000 | Chan et al. | 345/157 |
| 6,061,051 A | 5/2000 | Chan et al. | 345/173 |
| 6,061,464 A | 5/2000 | Leger | |
| 6,067,368 A | 5/2000 | Setlak et al. | |
| 6,069,970 A | 5/2000 | Salatino et al. | |
| 6,070,159 A | 5/2000 | Wilson et al. | |
| 6,088,471 A | 7/2000 | Setlak et al. | |
| 6,088,585 A | 7/2000 | Schmitt et al. | |
| 6,098,330 A | 8/2000 | Schmitt et al. | |
| 6,135,958 A | 10/2000 | Mikula-Curtis et al. | 600/443 |
| 6,141,753 A | 10/2000 | Zhao et al. | 713/176 |
| 6,181,807 B1 | 1/2001 | Setlak et al. | |
| 6,208,329 B1 | 3/2001 | Ballare | 345/173 |
| 6,219,793 B1 | 4/2001 | Li et al. | 713/202 |
| 6,219,794 B1 | 4/2001 | Soutar et al. | 713/202 |
| 6,239,790 B1 | 5/2001 | Martinelli et al. | |
| 6,248,655 B1 | 6/2001 | Machida et al. | 438/597 |
| 6,256,022 B1 | 7/2001 | Manaresi et al. | 345/174 |
| 6,259,804 B1 | 7/2001 | Setlak et al. | 382/124 |
| 6,278,443 B1 | 8/2001 | Amro et al. | 345/173 |
| 6,289,114 B1 | 9/2001 | Mainguet | |
| 6,317,508 B1 | 11/2001 | Kramer et al. | 382/124 |
| 6,323,846 B1 | 11/2001 | Westerman et al. | 345/173 |
| 6,330,345 B1 | 12/2001 | Russo et al. | 382/115 |
| 6,337,918 B1 | 1/2002 | Holehan | |
| 6,376,393 B1 | 4/2002 | Newton et al. | |
| 6,400,836 B2 | 6/2002 | Senior | |
| 6,404,900 B1 | 6/2002 | Qian et al. | 382/103 |
| 6,408,087 B1 | 6/2002 | Kramer | 382/124 |
| 6,442,286 B1 | 8/2002 | Kramer | |
| 6,459,804 B2 | 10/2002 | Mainguet | |
| 6,483,931 B2 | 11/2002 | Kalnitsky et al. | |
| 6,501,284 B1 | 12/2002 | Gozzini | |
| 6,512,381 B2 | 1/2003 | Kramer | |
| 6,515,488 B1 | 2/2003 | Thomas | |
| 6,518,560 B1 | 2/2003 | Yeh et al. | 250/214 |
| 6,535,622 B1 | 3/2003 | Russo et al. | 382/124 |
| 6,546,122 B1 | 4/2003 | Russo | 382/125 |
| 6,563,101 B1 | 5/2003 | Tullis | 250/208.1 |
| 6,580,816 B2 | 6/2003 | Kramer et al. | |
| 6,601,169 B2 | 7/2003 | Wallace, Jr. et al. | 713/151 |
| 6,603,462 B2 | 8/2003 | Matusis | |
| 6,628,812 B1 | 9/2003 | Setlak et al. | |
| 6,654,484 B2 | 11/2003 | Topping | |
| 6,661,631 B1 | 12/2003 | Meador et al. | 361/93.1 |
| 6,664,951 B1 | 12/2003 | Fujii et al. | 345/173 |
| 6,667,439 B2 | 12/2003 | Salatino et al. | |
| 6,668,072 B1 | 12/2003 | Hribernig et al. | 382/124 |
| 6,681,034 B1 | 1/2004 | Russo | 382/125 |
| 6,683,971 B1 | 1/2004 | Salatino et al. | |
| 6,744,910 B1 | 6/2004 | McClurg et al. | 382/124 |
| 6,754,365 B1 | 6/2004 | Wen et al. | 382/100 |
| 6,792,287 B1 * | 9/2004 | Huuskonen et al. | 455/556.1 |
| 6,804,378 B2 | 10/2004 | Rhoads | 382/100 |
| 6,876,756 B1 | 4/2005 | Vieweg | 382/124 |
| 6,961,452 B2 | 11/2005 | Fujii | 382/125 |
| 7,002,553 B2 | 2/2006 | Shkolnikov | 345/169 |
| 7,003,670 B2 | 2/2006 | Heaven et al. | 713/186 |
| 7,020,270 B1 | 3/2006 | Ghassabian | 379/368 |
| 7,054,470 B2 * | 5/2006 | Bolle et al. | 382/124 |
| 7,088,220 B2 | 8/2006 | Kotzin | 340/5.82 |
| 7,113,179 B2 | 9/2006 | Baker et al. | 345/178 |
| 7,136,514 B1 * | 11/2006 | Wong | 382/124 |
| 7,197,168 B2 | 3/2007 | Russo | 382/125 |
| 7,263,212 B2 | 8/2007 | Kawabe | 382/124 |
| 7,280,679 B2 | 10/2007 | Russo | 382/124 |
| 7,299,360 B2 | 11/2007 | Russo | 713/182 |
| 7,339,572 B2 | 3/2008 | Schena | 345/156 |
| 7,369,688 B2 | 5/2008 | Ser et al. | 382/124 |
| 7,474,772 B2 * | 1/2009 | Russo et al. | 382/124 |
| 2001/0017934 A1 | 8/2001 | Paloniemi et al. | 382/107 |
| 2001/0026636 A1 | 10/2001 | Mainguet | |
| 2001/0032319 A1 | 10/2001 | Setlak | |
| 2001/0043728 A1 | 11/2001 | Kramer et al. | |
| 2002/0054695 A1 | 5/2002 | Bjorn et al. | 382/124 |
| 2002/0109671 A1 | 8/2002 | Kawasome | 345/156 |
| 2002/0164057 A1 | 11/2002 | Kramer et al. | |
| 2002/0181747 A1 * | 12/2002 | Topping | 382/124 |
| 2002/0186203 A1 | 12/2002 | Huang | 345/157 |
| 2002/0188854 A1 * | 12/2002 | Heaven et al. | 713/186 |
| 2003/0002718 A1 | 1/2003 | Hamid | 382/124 |
| 2003/0016849 A1 | 1/2003 | Andrade | 382/124 |
| 2003/0021495 A1 | 1/2003 | Cheng | 382/312 |
| 2003/0025606 A1 | 2/2003 | Sabatini | |
| 2003/0028811 A1 * | 2/2003 | Walker et al. | 713/202 |
| 2003/0035568 A1 | 2/2003 | Mitev et al. | 382/124 |
| 2003/0035572 A1 | 2/2003 | Kalnitsky et al. | |
| 2003/0038824 A1 * | 2/2003 | Ryder | 345/684 |
| 2003/0044051 A1 | 3/2003 | Fujieda | 382/124 |
| 2003/0095691 A1 | 5/2003 | Nobuhara et al. | 382/124 |
| 2003/0108227 A1 | 6/2003 | Philomin et al. | |
| 2003/0115490 A1 | 6/2003 | Russo et al. | 713/202 |
| 2003/0123714 A1 * | 7/2003 | O'Gorman et al. | 382/124 |
| 2003/0126448 A1 * | 7/2003 | Russo | 713/186 |
| 2003/0135764 A1 | 7/2003 | Lu | 713/202 |
| 2003/0215116 A1 | 11/2003 | Brandt et al. | |
| 2004/0014457 A1 * | 1/2004 | Stevens | 455/414.1 |
| 2004/0042642 A1 | 3/2004 | Bolle et al. | 382/115 |
| 2004/0128521 A1 | 7/2004 | Russo | 713/186 |
| 2004/0148526 A1 * | 7/2004 | Sands et al. | 713/202 |
| 2004/0156538 A1 | 8/2004 | Greschitz et al. | 382/124 |
| 2004/0186882 A1 * | 9/2004 | Ting | 709/202 |
| 2004/0208348 A1 * | 10/2004 | Baharav et al. | 382/124 |
| 2004/0252867 A1 | 12/2004 | Lan et al. | 382/124 |
| 2004/0258282 A1 | 12/2004 | Bjorn et al. | 382/124 |
| 2004/0263479 A1 | 12/2004 | Shkolnikov | 345/169 |
| 2005/0012714 A1 | 1/2005 | Russo et al. | 345/157 |
| 2005/0041885 A1 * | 2/2005 | Russo | 382/289 |
| 2005/0091213 A1 | 4/2005 | Schutz et al. | 707/9 |
| 2005/0144329 A1 | 6/2005 | Tsai et al. | 710/1 |
| 2005/0179657 A1 | 8/2005 | Russo et al. | 345/163 |

| | | | | |
|---|---|---|---|---|
| 2005/0259851 A1 | 11/2005 | Fyke | | 382/124 |
| 2005/0259852 A1 | 11/2005 | Russo | | 382/124 |
| 2006/0002597 A1 | 1/2006 | Rowe | | 382/124 |
| 2006/0034043 A1 | 2/2006 | Hisano et al. | | 361/681 |
| 2006/0036873 A1 | 2/2006 | Ho et al. | | 713/186 |
| 2006/0078174 A1 | 4/2006 | Russo | | 382/121 |
| 2006/0103633 A1 | 5/2006 | Gioeli | | 345/173 |
| 2006/0242268 A1 | 10/2006 | Omernick et al. | | 709/219 |
| 2006/0280346 A1* | 12/2006 | Machida | | 382/124 |
| 2007/0014443 A1 | 1/2007 | Russo | | 382/124 |
| 2007/0016779 A1 | 1/2007 | Lyle | | 713/169 |
| 2007/0034783 A1 | 2/2007 | Eliasson et al. | | 250/221 |
| 2007/0038867 A1 | 2/2007 | Verbauwhede et al. | | 713/186 |
| 2007/0061126 A1 | 3/2007 | Russo et al. | | 703/24 |
| 2007/0067642 A1 | 3/2007 | Singhal | | 713/186 |
| 2007/0125937 A1 | 6/2007 | Eliasson et al. | | 250/221 |
| 2007/0146349 A1 | 6/2007 | Errico et al. | | 345/174 |
| 2007/0274575 A1 | 11/2007 | Russo | | 382/124 |
| 2008/0013808 A1 | 1/2008 | Russo et al. | | 382/125 |

FOREIGN PATENT DOCUMENTS

| | | |
|---|---|---|
| EP | 1 113 383 A2 | 7/2001 |
| EP | 1 113 405 A2 | 7/2001 |
| EP | 1 143 374 B1 | 2/2005 |
| JP | 11-250251 | 9/1999 |
| JP | 11-296678 | 10/1999 |
| JP | 2000-048208 | 2/2000 |
| JP | 2000-056877 A | 2/2000 |
| WO | WO 98/15225 | 4/1998 |
| WO | WO 98/52145 | 11/1998 |
| WO | WO 98/52146 | 11/1998 |
| WO | WO 98/52147 | 11/1998 |
| WO | WO 98/52157 | 11/1998 |
| WO | WO 99/43258 | 9/1999 |
| WO | WO 00/68873 | 11/2000 |
| WO | WO 00/68874 | 11/2000 |
| WO | WO 00/72507 A1 | 11/2000 |
| WO | WO 01/09819 A1 | 2/2001 |
| WO | WO 01/09936 A1 | 2/2001 |
| WO | WO 01/29731 A1 | 4/2001 |
| WO | WO 01/39134 A3 | 5/2001 |
| WO | WO 01/65470 A1 | 9/2001 |
| WO | WO 01/73678 A1 | 10/2001 |
| WO | WO 01/77994 A1 | 10/2001 |
| WO | WO 01/80166 A3 | 10/2001 |
| WO | WO 01/94892 A3 | 12/2001 |
| WO | WO 01/94902 A2 | 12/2001 |
| WO | WO 01/94966 A2 | 12/2001 |
| WO | WO 01/95305 A1 | 12/2001 |
| WO | WO 01/99035 A2 | 12/2001 |
| WO | WO 01/99036 A2 | 12/2001 |
| WO | WO 02/15209 A3 | 2/2002 |
| WO | WO 02/15267 A2 | 2/2002 |
| WO | WO 02/44998 A1 | 6/2002 |
| WO | WO 02/069386 A1 | 9/2002 |
| WO | WO 02/071313 A1 | 9/2002 |
| WO | WO 02/073375 A2 | 9/2002 |
| WO | WO 02/086800 A1 | 10/2002 |
| WO | WO 02/093462 A1 | 11/2002 |
| WO | WO 02/095349 A1 | 11/2002 |
| WO | WO 03/007127 A2 | 1/2003 |
| WO | WO 03/017211 A2 | 2/2003 |
| WO | WO 03/049011 A1 | 6/2003 |
| WO | WO 03/049012 A2 | 6/2003 |
| WO | WO 03/049016 A2 | 6/2003 |
| WO | WO 03/049104 A1 | 6/2003 |
| WO | WO 03/075210 A2 | 9/2003 |

OTHER PUBLICATIONS

"*Fingernail Touch Sensors: Spatially Distributed Measurement and Hemodynamic Modeling*", Stephen Mascaro and H. Harry Asada, 2000 IEEE, pp. 3422-3427.

S. Shigematsu et al., "A Single-Chip Fingerprint Sensor and Identifier", IEEE Journal of Solid-State Circuits, vol. 34, No. 12, Dec. 1999, pp. 1852-1859.

I-Control, PDS 3000 TM Product Brief "*Mobile Finger-Based Control Sensor*", 2 pages, Jul. 2003.

Biometrics, "*A Responsive Supply Chain*", By Andrew Conry-Murray, 5 pages, posted Jul. 7, 2002, as printed Aug. 23, 2004, at http://www.networkmagazine.com/shared/article/ ID-17601104.

Ballard and Brown, "*Computer Vision*", Prentice Hall, 1982, pp. 66-69.

Choonwoo Ryu et al. "Super-template Generation Using Successive Bayesian Estimation for Fingerprint Enrollment", 2005 Springer-Verlag Berlin Heidelberg, pp. 710-719.

Dongjae Lee et al. "Fingerprint Fusion Based on Minutiae and Ridge for Enrollment", 2003 Springer-Verlag Berlin Heidelberg, pp. 478-485.

Koichi Sasakawa et al. "Personal Verification System with High Tolerance of Poor Quality Fingerprints", 1990 Machine Vision Systems Integration in Industry, pp. 265272.

Michal Irani et al. "Improving Resolution by Image Registration", 1991 by Academic Press, Inc., pp. 231-239.

Qinfen Zheng et al. "A Computational Vision Approach to Image Registration", 1992 IEEE, pp. 193-197.

Wei-Yun Yau et al. "Fingerprint Templates Combination", 2004 Springer-Verlag Berlin Heidelberg, pp. 449-460.

Xudong Jiand et al. "Detecting the Fingerprint Minutiae by Adaptive Tracing the Gray-Level Ridge", 2001, pp. 999-1013, Published by Elsevier Science Ltd.

Xudong Jiang et al. "Fingerprint Minutiae Matching Based on the Local and Global Structures", 2000 Ieee, pp. 1038-1041.

Jacob O. Wobbrock, Brad A. Myers, Htet Htet Aung, and Edmond F. LoPresti, Text Entry from Power Wheelchairs: EdgeWrite for Joysticks and Touchpads, Jan. 2004, pp. 110-117, Human-Computer Interaction Institute School of Computer Science Carnegie Mellon University, Pittsburg, PA.

Xudong Jiang et al., "Fingerprint Minutiae Matching Based on the Local and Global Structures," Sep. 2000, pp. 1038-1041, IEEE.

Kyung Deok Yu et al., "A Fingerprint Matching Algorithm based on Radial Structure and a Structure-Rewarding Scoring Strategy," Jun. 2005, pp. 656-664, AVBPA, LNCS, Audio- and Video-Based Biometric Person Authentication Springer-Verlag Berlin Heidelberg.

Softex OmniPass Mobile Edition Version 3.0, Users' Guide, Document #:SOF-OPME30-UG-1.0, pp. 1-13, © Copyright 2003-2005 by Softex Incorporated.

* cited by examiner

200

201    204    206

| | | |
|---|---|---|
| 210 → | {email.pls} 214 | "John Doe","password 1" 216 |
| 220 → | {calc.vbs} 224 | 226 |
| 230 → | {Wordprocessor.exe} 234 | "Font=roman; size = 12" 236 |
| | ... | |
| 240 → | {phone.pls} 244 | "10102504055551212" 246 |
| 250 → | {ftp.pls} {email.pls} 254 | "http://www.site.com", "joe@yahoo.com" 256 |

(fingerprint column labels: 211, 221, 231, 241, 251)

*Fig. 2*

SYSTEM FOR AND METHOD OF FINGER INITIATED ACTIONS

RELATED APPLICATION

This application claims priority under 35 U.S.C. §119(e) of the co-pending U.S. provisional application Ser. No. 60/540,950, filed on Jan. 29, 2004, and titled "SYSTEM FOR AND METHOD OF FINGER INITIATED ACTIONS." The provisional application Ser. No. 60/540,950, filed on Jan. 29, 2004, and titled "SYSTEM FOR AND METHOD OF FINGER INITIATED ACTIONS" is hereby incorporated by reference.

FIELD OF THE INVENTION

This invention relates to device controllers. More specifically, this invention relates to device controllers that use fingerprints to automatically perform tasks on an electronic device.

BACKGROUND OF THE INVENTION

Electronic computing platforms are used in every aspect of our daily lives. Devices such as personal computers, personal digital assistants (PDAs), mobile phones, portable game consoles, remote controls, and digital cameras all provide multiple functions and services on which we depend heavily. To use services available on these platforms, however, a user typically must make a series of inputs or selections. For example, a personal computer user must find the icon of an application and double click on it to launch the application; a mobile phone user must enter the destination phone number and then press the send button to make a phone call; an e-mail user must enter her user name and password to access her e-mail account.

When the same services are used or the same phone numbers are dialed every day, users often look for more convenient solutions. Shortcuts are used to reduce the number of steps and to simplify the steps required by a user to perform a task on an electronic device. For example, shortcut links are placed on the desktop of a personal computer; PDA's have a shortcut button to launch a calendar application; mobile phones support speed dial phone numbers.

To many users, even shortcuts are not convenient enough. Short cuts on the desktop of a personal computer still require the user to move a pointer to select and launch a software application. The speed dial function of mobile phones still requires users to push at least 2 or 3 buttons. Users often forget the sequence of keystrokes or mouse clicks that provide a short cut. Moreover, these keypads and mice require valuable space, a disadvantage especially on portable electronic devices.

Accordingly, what is needed is a system for and a method of executing tasks on an electronic device using a minimal footprint. What is also needed is a system for and a method of executing tasks on an electronic device using a minimal amount of entries, such as keystrokes or button presses. What is also needed is a system for and a method of authenticating a user before allowing him or her to perform tasks on an electronic device, using a minimal number of entries.

BRIEF SUMMARY OF THE INVENTION

A fingerprint control system provides a method of and system for reading a biometric image and performing an associated task having a chain of tasks. The task can include launching a computer program, such as an executable file, a macro, and a script; executing a function on an electronic device; or any combination of these.

In a first aspect of the present invention, a method of performing a task on an electronic device comprises matching read biometric data to stored biometric data having a corresponding task comprising a first chain of tasks and automatically performing the corresponding task on the electronic device. Preferably, the biometric data comprises fingerprint data. The corresponding task is selected from a plurality of tasks that the electronic device is configured to perform. The corresponding task has optional parameters.

In one embodiment, automatically performing a task comprises retrieving user profile data corresponding to a user and the task, and using the user profile data to perform the task. The user profile data comprises a telephone number and the corresponding task comprises dialing the telephone number. Alternatively, the user profile data comprises login information for accessing a host system and the corresponding task comprises transmitting the login information to the host system. The corresponding task comprises accessing a resource over a network such as a local area network or the Internet. A task in the first chain of tasks comprises encrypting the login information before transmitting the login information to the host system. The corresponding task comprises an interactive task.

In one embodiment, performing the corresponding task comprises executing a computer game, remotely controlling a remote-controlled system, or performing a non-inherent function of the electronic device. Preferably, the corresponding task further comprises a second chain of tasks. In one embodiment, the first chain of tasks and the second chain of tasks are performed in parallel.

In one embodiment, the method further comprises reading biometric data. Reading biometric data comprises reading data captured during a finger placement on a fingerprint image sensor. Alternatively, reading biometric data comprises reading data captured during a finger swipe over a fingerprint image sensor. In one embodiment, matching biometric data to stored biometric data comprises identifying a direction of the finger swipe, a first direction having the corresponding task and a second direction having a different corresponding task. Matching read biometric data to stored biometric data comprises determining whether a threshold number of points of read fingerprint data coincide with a number of points of stored fingerprint data.

Preferably, the electronic device is portable, such as a personal digital assistant, a telephone, or any other hand-held device. Alternatively, the electronic device comprises a personal computer, a remote controller, a security system, a television set, an audio player, a game device, or any combination of these.

In another embodiment, the stored biometric data is an ordered set of biometric data, such as a permutation of biometric data or a combination of biometric data. The read biometric data must also be a permutation or a combination of biometric data in order to match the stored biometric data.

In another embodiment, the corresponding task relates to a context of an application executing on the electronic device. The stored biometric data corresponds to one set of stored biometric data from a plurality of sets of stored biometric data from a plurality of users.

In a second aspect of the present invention, an electronic device comprises (a) a biometric sensor for reading biometric data; (b) a memory storing a plurality of stored biometric data each having a corresponding task identifier used to perform a corresponding task, at least one task comprising a chain of tasks; and (c) a processor coupled to both the biometric sensor and the memory, the processor configured to match read biometric data with stored biometric data and to automatically perform a corresponding task on the electronic device. Preferably, the biometric sensor comprises a fingerprint image sensor, such as a placement sensor or a swipe sensor. In one embodiment, the swipe sensor is configured to detect a direction of a swipe, a first direction having a first task identifier and a second direction having a second task identifier.

In one embodiment, the memory is further configured so that a task identifier also has user profile data corresponding to a user and the task. The task identifier has optional parameters. The corresponding task relates to a context of an application executing on the electronic device.

In one embodiment, the electronic device further comprises a telephone operatively coupled to the processor. The user profile data comprises a telephone number and the corresponding task comprises dialing the telephone number on the telephone. The electronic device further comprises a link to a network, such as the Internet. The user profile data comprises a resource locator, and the corresponding task comprises connecting the electronic device to a host identified by the resource locator and accessible over the network. In one embodiment, the link comprises a wireless transmitter. The fingerprint image sensor comprises a thermal sensor, an optical sensor, a pressure sensor, or a capacitive sensor. Preferably, the processor is configured to execute two tasks in parallel.

In a third aspect of the present invention, a method of initializing an electronic device comprises reading biometric data, storing the biometric data, and mapping the stored biometric data to a chain of tasks that are automatically performed on an electronic device.

BRIEF DESCRIPTION OF THE SEVERAL VIEWS OF THE DRAWINGS

FIG. 2 shows an array used to store fingerprint images and to associate each fingerprint image with a task and the task's parameters in accordance with one embodiment of the present invention.

DETAILED DESCRIPTION OF THE INVENTION

Figure 1:
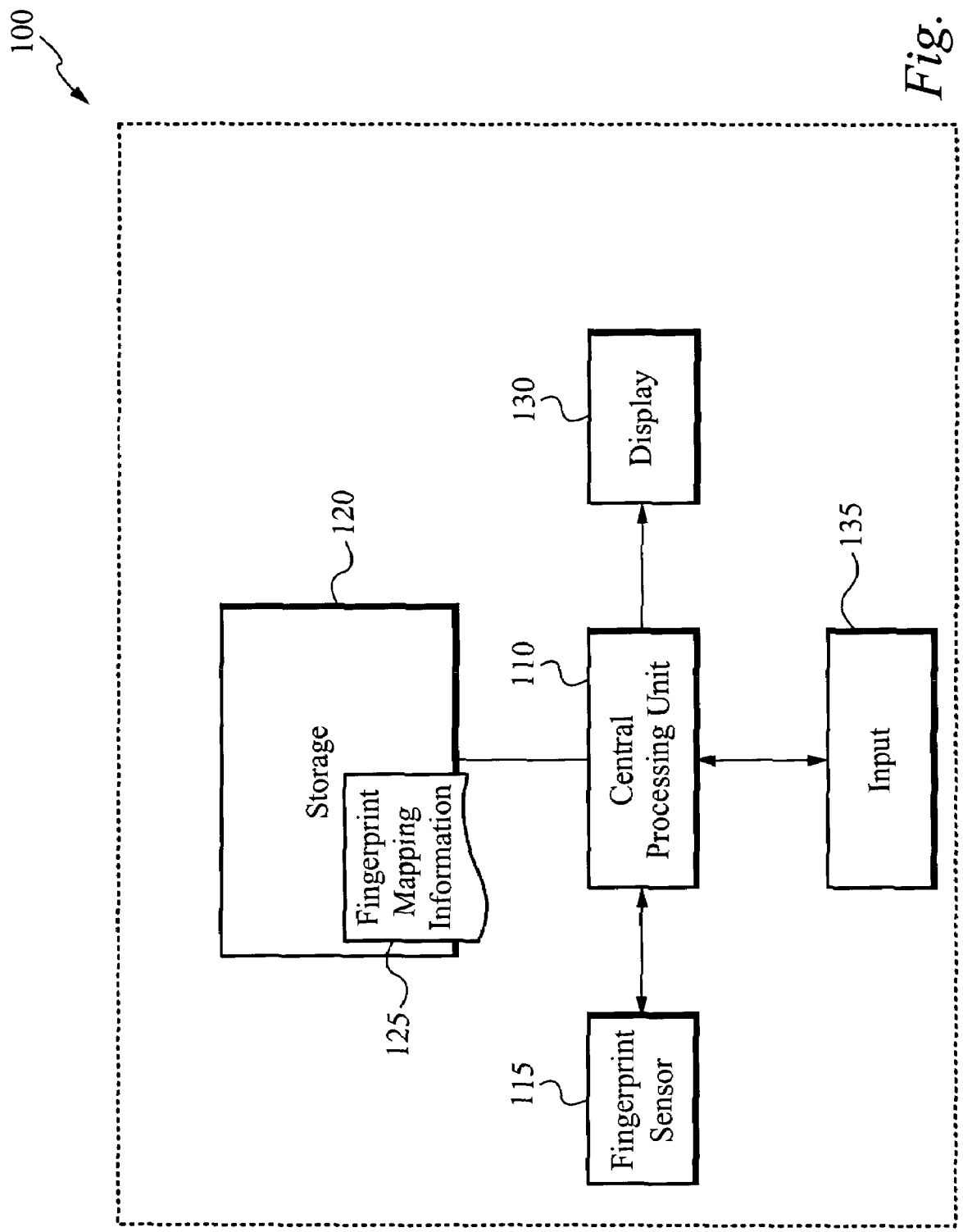
FIG. 1 is a block diagram of a fingerprint control system in accordance with one embodiment of the present invention.

In accordance with the present invention, a fingerprint image can be used to initiate one or more associated tasks on an electronic device. In one embodiment, the electronic device reads a fingerprint image and performs a specific task associated with a fingerprint image. Thus, for example, if the electronic device is a personal computer (PC), when a user places or swipes her index finger on a fingerprint sensor coupled to or part of the PC, the PC launches a web browser; when the user places or swipes her thumb on the fingerprint sensor, the PC connects to the e-mail account of the user; when the user places or swipes her ring finger on the fingerprint sensor, the PC runs a calculator program. Thus, each fingerprint image can be used to perform tasks on an electronic device. Likewise, a pair of fingerprint images can be used to perform a task on the electronic device. If a single fingerprint image is used to determine a task, ten unique tasks can be performed by a user. If a pair of fingerprint images (e.g. a combination of two images) are used to determine a task, up to one hundred unique tasks (10×10) can be performed by a user.

As used herein, a task is any operation on an electronic device. Thus, the performance of a task includes, but is not limited to, (1) the execution of an inherent function of an electronic device, such as copying on a photocopier; (2) the launching of a program, such as a Web browser, e-mail program, or electronic calculator, that is not specific or inherent to a particular electronic device, including interactive programs; (3) any performance of one or more steps on the electronic device to perform any operation; or (4) any combination or permutation of the above. Thus, a task can include the inherent function of powering ON an electronic device, launching a Web browser to connect to a remote host machine, and automatically transmitting a user name and password to the host machine to log on to the host machine. The words "tasks" and "actions" are used interchangeably herein. As used herein, the term "computer program" refers to executable files, scripts, macros, and any sequence of instructions that can control the performance of tasks on an electronic device.

Embodiments of the present invention thus advantageously (1) reduce the number of entries that a user must make to perform a task—rather than entering numerous keystrokes to connect to an e-mail account, a single finger placement or swipe can accomplish the same task; (2) reduce the footprint of an electronic device since keypads, function buttons, joy sticks, and mice can be replaced with a fingerprint image sensor; (3) reduce the complexity of user interfaces since a user does not have to remember keystrokes, logon information, or other information needed to perform a task; and (4) increase the security of electronic devices since, using a fingerprint, a user can be authenticated each time she requests that a task be performed so that the authentication and the performance of the task can be accomplished using a single finger swipe or placement. Embodiments of the present invention accomplish any one or more of these results.

FIG. 1 is a schematic diagram of a fingerprint control system 100 in accordance with the present invention. The fingerprint control system 100 comprises a central processing unit 110 electronically coupled to a fingerprint sensor 115, a storage unit 120, a display unit 130, and an input unit 135. The storage unit 120 comprises a mapping store 125 containing fingerprint mapping information, such as the task information and associated parameters described in more detail below. It will be appreciated that the fingerprint control system 100 can be a stand-alone system comprising an electronic device or can be coupled to an external electronic device (not shown) and used to control the external electronic device as described below.

The fingerprint sensor 115 is used to read the image of a fingerprint placed upon it. The fingerprint sensor 115 can be a placement sensor or a swipe sensor. Placement sensors require a user to place her finger on a reading surface of the fingerprint sensor until a fingerprint image is captured. Placement sensors are designed to actively sense the entire surface of a finger at once. Placement sensors can be based on optical, thermal, pressure, electrical, or other sensing means. In general placement sensors are designed to have a reading surface with an area as large as the pad of a typical human finger, typically 15 mm². It will be appreciated that the area of the reading surface in accordance with the present invention can be larger or smaller than 15 mm².

Alternatively, the fingerprint sensor 115 can be a swipe sensor. In general, swipe sensors are fully sized in one direction (typically in width) but abbreviated in the other (typically in height). Swipe sensors are thus configured to sense only a small rectangular portion of a finger at any one time. To capture a fingerprint image, a user needs to swipe his finger over the sensor. Swipe sensors are especially suitable for portable devices because they are smaller than placement sensors. Methods of and systems for fingerprint sensing are described in detail in the U.S. patent application Ser. No. 10/194,994, filed Jul. 12, 2002, and titled "Method and System for Biometric Image Assembly from Multiple Partial Biometric Frame Scans," and in the U.S. patent application Ser. No. 10/099,558, filed Mar. 13, 2002, and titled "Fingerprint Biometric Capture Device and Method with Integrated On-Chip Data Buffering," both of which are hereby incorporated by reference in their entireties. In the preferred embodiment, the fingerprint sensor is a ATW100 capacitive swipe sensor by Atrua Technologies, Inc., at 1696 Dell Avenue, Campbell, Calif. 95008. It will be appreciated that any sensor technology can be used in accordance with the present invention.

The input device 135 is used to input information, such as task information, into the fingerprint control system 100. For example, as described in more detail below, an administrator or user may use the input device to enter a user name and password associated with a fingerprint image. Thus, for example, when a user places her thumb on the fingerprint sensor 115, a Web browser is opened, a connection made to an e-mail server, and the user name and password are automatically transmitted to the e-mail server so that an e-mail session is automatically initiated for the user. The input device can be used to type in the task information associated with her thumb print. Such task information can include (1) parameters such as a user name and password and (2) the name or memory address of one or more programs that launch a Web browser, connect to an e-mail server, and transmit the user name and password combination.

The input device 135 can be any type of device for inputting information including, but not limited to, a keyboard, a mouse, a touch screen, and a port for receiving information from an electronic device such as a personal digital assistant (PDA). When entering the task information, such as a user name and password, into the fingerprint control system 100, the typed information can be displayed on the display unit 130. It will be appreciated that the input device 135 and the display unit 130 are typically used only when the fingerprint control system 100 is being initialized, such as described in FIG. 6, and thus both are optional and can be absent when the fingerprint control system 100 is used in normal operation, such as performing a task.

The storage unit 120 comprises a fingerprint mapping store 125 used to store fingerprint mapping information. As described in more detail below, the fingerprint mapping information comprises a plurality of fingerprint images, their associated tasks, and the parameters used by the tasks. Thus, when the fingerprint sensor 115 reads a fingerprint image (the read fingerprint image), a control program executed by the CPU 110 compares the read fingerprint image to fingerprint images stored in the fingerprint mapping store 125. These stored fingerprint images are referred to as "enrolled fingerprint images" or "stored fingerprint images." When the control program matches the read fingerprint image to an stored fingerprint image, the CPU 110 will execute the tasks associated with the matched stored fingerprint image, using the associated parameters, if any. In a preferred embodiment, the fingerprint mapping information is stored in a fingerprint array (table) where the index or key is a fingerprint image and the associated task is the value for the array. FIG. 2 shows one embodiment of a fingerprint array, described in more detail below. Using a fingerprint array, the control program can quickly associate a fingerprint image to its corresponding task.

The electronic device to be controlled by the fingerprint control system 100 can include the same hardware as the fingerprint control system 100. Thus, for example, if the electronic device is a PC, the PC can also comprise one or more of the CPU 110, the fingerprint sensor 115, the storage 120, the display 130, and the input device 135. The CPU 110 can execute fingerprint operations as well as other application programs. Similarly, if the electronic device is a telephone, the fingerprint control system 100 can reside on and form part of the telephone. Thus, the fingerprint sensor 115 can be integrated into a telephone case, the display 130 can be a telephone liquid crystal display unit, and the input 135 can be the telephone keypad. Alternatively, the fingerprint control system 100 can reside on hardware separate from the electronic device it controls. Thus, for example, if the electronic device is a coffee maker, the fingerprint control system can be electronically coupled to the coffee maker. Thus, a user can use the fingerprint control system 100 to launch a program, and the program can send control signals to the coffee maker, thereby controlling the coffee maker.

It will be appreciated that the fingerprint control system 100 can be coupled to the electronic device in any number of ways, depending on the application at hand. The fingerprint control system 100 can be directly coupled to the electronic device using control wires. Alternatively, the fingerprint control system 100 can be coupled to the electronic device over a local area network, using for example the Ethernet protocol, or over a wide area network, using, for example, TCP/IP. Also, the fingerprint control system 100 can be wirelessly coupled to the electronic device using radio or infrared signals. It will also be appreciated that the electronic device can also be coupled to a remote host using, for example, a wireless transmitter or a wireless transceiver.

FIG. 2 illustrates one embodiment of a fingerprint array 200 in accordance with one embodiment of the present invention. The fingerprint array 200 comprises rows 210, 220, 230, 240, and 250 and columns 201, 204, and 206. It will be understood by those of ordinary skill in the are that rows and columns are representative only. Any other database technique can be used with equal success. The column 201 contains multiple fingerprint images, 211, 221, 231,241 and 251. The column 204 contains associated tasks (here, scripts or executable files). The column 206 contains any parameters for each associated task. In one embodiment, the parameters are input to the programs or scripts shown in the column 204.

The row 210 contains the stored fingerprint image 211, its associated task 214, and the parameter list 216 used to perform the associated task 214. In this example, the associated task 214 contains the PERL script email.pls, which is used to access an email account. Of course, any other software language can be used. The parameter list 216 contains a first element, "John Doe", and a second element, "password1". The performance of a task to access an email account using the associated task 214 and its parameter list 216 are described in detail relative to FIG. 4 below, describing the steps performed to execute a task when a read fingerprint image matches the stored fingerprint image 211. The first element, "John Doe", and the second element, "password1", are one example of what are referred to as user profile data, that is, data specific to a fingerprint image (or other fingerprint data) and used to perform a task.

The row 220 contains the stored fingerprint image 221 and its associated task 224. The empty cell 226 indicates that no parameters are required to perform the associated task 224. The associated task 224 comprises one operation executed by the Visual BASIC script calc.vbs, which launches a calculator, allowing a user to perform mathematical operations on the electronic device. Thus, when a read fingerprint image matches the stored fingerprint image 221, the control program launches (e.g., calls) calc.vbs, which displays a calculator GUI on a display device (e.g., 130, FIG. 1). The user can then enter onto an input device (e.g., 135, FIG. 1) operands in a mathematical equation, which the calculator computes and displays an answer.

The row 230 contains the stored fingerprint image 231, its associated task 234, and the parameter list 236 used to perform the associated task 234. The associated task 234 is performed by launching the executable file "Wordprocessor.exe". In this example, when a read fingerprint image matches the stored fingerprint image 231, the control program calls Wordprocessor.exe, which presents a user interface to a word processor, such as Wordperfect, Word, vi, or any other kind of word processor. The parameter list 236 passed to the word processing program, "Font=roman; size=12" can be used to automatically set the font style to "Roman" and the size (point) to "12". The parameter list 236 can be passed to the word processing program in a variety of ways. For example, the parameter list 236 can be sent to the word processing in a macro that is automatically called, by a template, by a style sheet, or by any other means.

The row 240 contains the stored fingerprint image 241, its associated task 244, and parameter 246 used by the associated task 244. The associated task 244 is performed by the PERL script phone.pls. The parameter 246 comprises the string "10102504085551212" designating a calling card code and a telephone number. Thus, when a read fingerprint image matches the fingerprint image 241, the control program calls phone.pls to launch a telephone program that dials the digits "10102504085551212". In accordance with one embodiment of the present invention, FIG. 5 describes the tasks executed when a read fingerprint image matches the stored fingerprint image 241.

The row 250 contains the fingerprint image 251, its associated task 254, and the parameter list 256 used by the associated task 254. The associated task 254 is performed by the PERL scripts ftp.pls and email.pls. The first element of the parameter list 256 comprises the string "http://www.site-.com", and the second element of the parameter list 256 comprises the string "joe@yahoo.com." In this example, when a read fingerprint image matches the stored fingerprint image 251, the control program calls the program ftp.pls and passes it the first element of the parameter list 256 "http://www.site.com" to download a file from the Web site "http://www.site.com" using the file transfer protocol. The control program then attaches the file to an e-mail addressed to the e-mail address stored in the second element of the parameter list 256, "joe@yahoo.com", and then calls the script email.pls to send the e-mail. Thus, in this example, a file stored at a Web address and containing information that may be updated periodically can be automatically sent to a specific user. This example illustrates nested tasks, where one task can include the performance of multiple tasks, here the downloading of a file and the sending of the file by email. In this example, the task performed by the script ftp.pls is said to be chained to the task performed by the script email.pls.

Preferably, fingerprint data that uniquely identifies a fingerprint image rather than an entire fingerprint image is stored in the fingerprint array 200. The fingerprint data will correspond to a subset of the entire fingerprint image, thus requiring less data storage. This fingerprint data can correspond, for example, to multiple minutiae points for a fingerprint. Thus, for example, when a fingerprint image is read by a fingerprint sensor, an extracted set of unique fingerprint data is stored in a template. It will be appreciated that any reference herein to fingerprint images will also correspond to fingerprint data.

It will be appreciated that fingerprint images can be correlated to tasks using structures other than the fingerprint array 200. Rather than storing fingerprint images 211, 221, 231, 241, and 251 in the column 201, other fingerprint identifiers that uniquely identify a fingerprint image can be used. For example, rather than storing fingerprint images in the array 200, pointers to fingerprint images can be stored. The fingerprint pointers can contain the address of fingerprint images stored elsewhere in the storage 120 (FIG. 1) or at other locations, as described below. In addition, fingerprint images, associated tasks and their parameters can be stored in other data structures such as a hash (associative array), with each fingerprint image as a key, and the corresponding tasks and parameters as values. Alternatively, the fingerprint image and corresponding tasks and parameters can be stored in a database. Many structures can be used, depending on the application at hand. For example, if the electronic device is a PC, then a database and its associated database management system can be used in conjunction with the control program. If the electronic device is smaller, such as a PDA, and has less memory, an array can be used.

Figure 3:
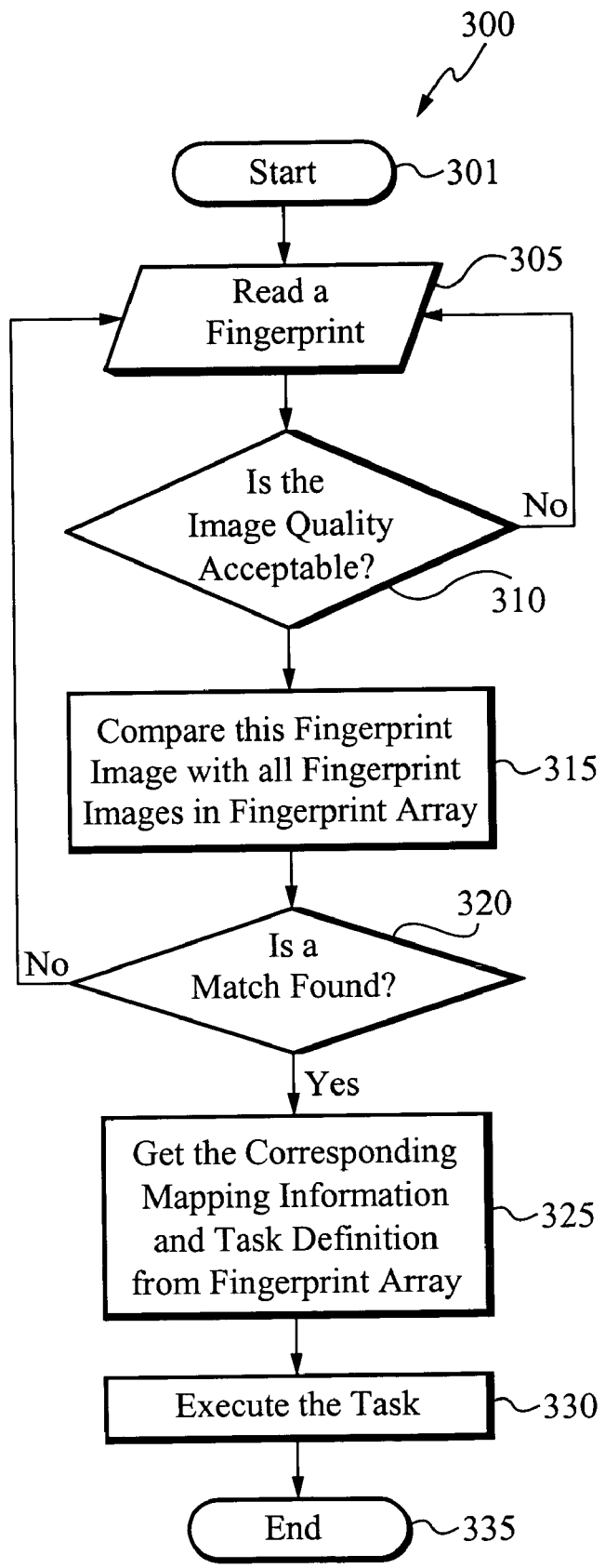
FIG. 3 is a flow chart illustrating the steps executed by a fingerprint control system in accordance with one embodiment of the present invention.

FIG. 3 is a flow chart illustrating the steps 300 taken by a control program in accordance with the present invention and used to perform a task after a fingerprint image is read from the fingerprint sensor 115 of FIG. 1. Referring to FIGS. 1 and 3, in the start step 301, the fingerprint sensor 115 and any data and variables used by the control program are initialized. Next, in the step 305, the user swipes or places her finger on the fingerprint sensor 115. Next, in the step 310, the control program determines whether the image quality of the read (scanned) fingerprint image is acceptable. If it is not, the user is prompted (for example on the display device 130) to again swipe or place her finger on the fingerprint sensor 115. Alternatively, if an optional display is absent the unit can beep or blink on LED to signal the user. The control program then loops back to the step 305. It will be appreciated that the control program can be configured to allow only a pre-determined number of unacceptable images to be scanned. After this limit is reached, the control program can alert the user that the fingerprint sensor 115 is dirty or damaged.

If it is determined in the step 310 that the quality of the read fingerprint image is acceptable, the control program continues to the step 315, where it compares the read fingerprint image with the stored fingerprint images in the column 201 of the fingerprint array 200 of FIG. 2. Fingerprint images can be compared sequentially or using some weight based on the number of times a particular fingerprint was matched in earlier sessions. A stored fingerprint image (and thus a corresponding task) may match more often (e.g., corresponding to a popular task) and thus will first be compared with other stored fingerprint images. By comparing a read fingerprint image first with an often accessed fingerprint image, the average number of comparisons on a fingerprint control system can be reduced.

Next, in the step 320, the control program checks whether the read fingerprint image matches the current candidate stored fingerprint image. If a match is not found, the control program proceeds to the step 305. If a match was found (e.g., matching the read fingerprint image to the stored fingerprint image 211), the control program continues processing at the step 325. At the step 325, the control program retrieves the corresponding task (e.g., the script email.pls in the field 214) and the corresponding parameters (e.g., the parameter list 216). Next, in the step 330, the control program performs the corresponding task (e.g., calls or launches the script email-.pls) using the corresponding parameters (e.g., the user name "John Doe" and the password "password1"). It will be appreciated that executing one task can comprise executing one or more tasks in a task chain. Next, in the step 335, the control program ENDS.

In accordance with one embodiment of the present invention, a "test" fingerprint image (also referred to as a "read fingerprint image" or a "candidate fingerprint image") is compared to fingerprint images in a set of stored fingerprint images. The read fingerprint image is read when a user places or swipes her finger on a fingerprint sensor. The read fingerprint image may not exactly match any image in the set of stored fingerprint images. Therefore, the candidate fingerprint image is compared to all of the stored fingerprint images to compute a matching score, a number reflecting the number of matching minutiae points. The stored fingerprint image with the highest match score is considered the best match, as long as the score is above a predetermined match threshold. If it is not above this threshold, none of the stored fingerprint images is considered a match.

The threshold is required because some security systems cannot be sure whether an impostor is trying to fool it. In certain circumstances the cost of illicit access can be excessively high (hence the need for fingerprints in the first place). In low-security systems, the match threshold can be made artificially low, so that the best matching fingerprint image is always selected. In this way, fingerprint images that might not match with a higher threshold (due to noise, for instance), will be properly matched at the lower threshold, thereby reducing user inconvenience due to system error. Such an approach is only acceptable if the finger initiated actions do not need high security protection (e.g. the actions can be started in other ways with more steps or keystrokes).

Figure 4:
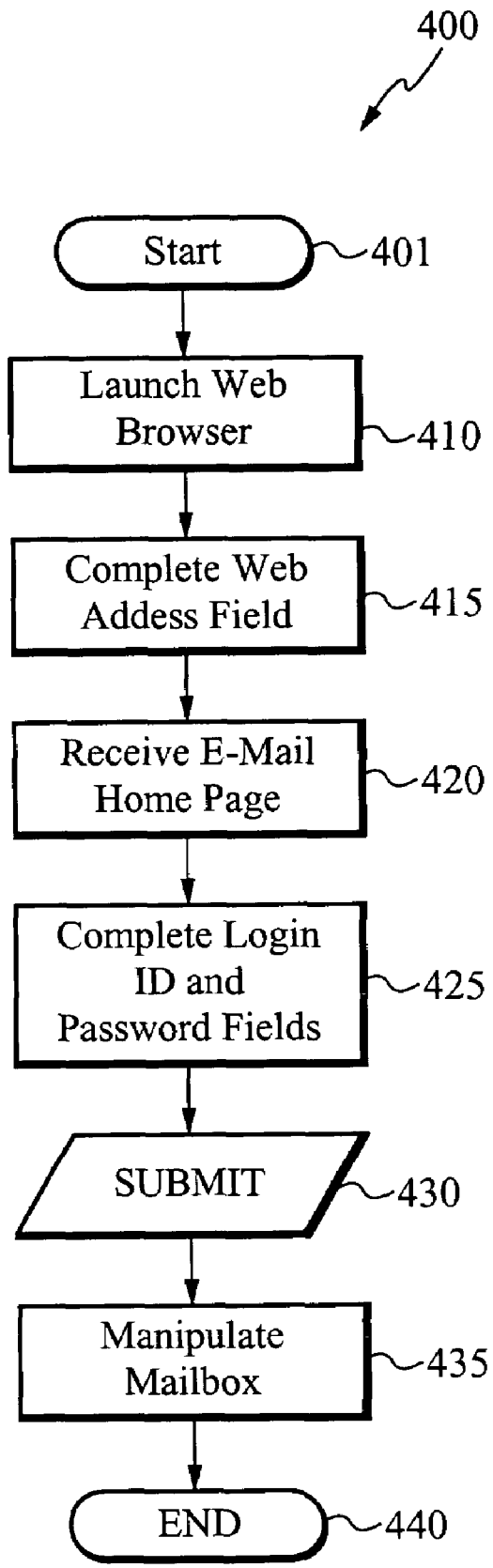
FIG. 4 is a flow chart illustrating the steps executed by a fingerprint control system to perform the task of automatically logging into an e-mail server in accordance with one embodiment of the present invention.

FIG. 4 illustrates the steps 400 taken to perform the task of automatically logging a user into her e-mail account so that the logon page is automatically bypassed, and the command page is displayed. The steps 400 correspond to the step 330 in FIG. 3 and are performed, for example, when a read fingerprint image matches the stored fingerprint image 211 in FIG. 2. Referring to FIGS. 1 and 2, for this example, it is assumed that the stored fingerprint image 211 is read by the fingerprint sensor 115. First, in the Start step 401, the fingerprint sensor 115 and any data structures used by the control program are initialized. Next, in the step 410 the Web browser is automatically launched on the user's electronic device. A Uniform Resource Locator (URL) for her e-mail account is automatically input into the address field of the Web browser in the step 415. In the step 420, the home page for the user's e-mail server is received and displayed on the user's electronic device. Next, in the step 425, the user's login ID ("John Doe", the first element in the parameter list 216) and password ("password1", the second element in the parameter list 216) are automatically input into the appropriate fields of the e-mail home page. The SUBMIT command is then automatically invoked in the step 430. The user's mailbox can then be manipulated in the step 435, either manually, by the user, or automatically, by software in accordance with the present invention. The mailbox can be manipulated by, for example, displaying messages from the user's e-mail account, automatically composing a new e-mail message, allowing the user to compose a new e-mail or delete an old one. The process ends in the step 440 when, for example, the user logs off from her e-mail account.

It will be appreciated that a user can access her mailbox or e-mail account in accordance with the present invention in other ways. For example, the control program can call other software, such as Messaging Application Programming Interface (MAPI), which allows a user to seamlessly manipulate e-mail accounts and mailboxes. The control program can invoke a Web browser and post an HTML form to automatically log on to an e-mail server to access her account. The user can manipulate her e-mail account without using a Web browser, by using, for example, a command line such as used in the UNIX environment. It will be appreciated that user name, passwords, and other secured information can be used in other environments in accordance with the present invention, such as with online banking or other online purchasing where credit card and other confidential information can be transmitted.

Figure 5:
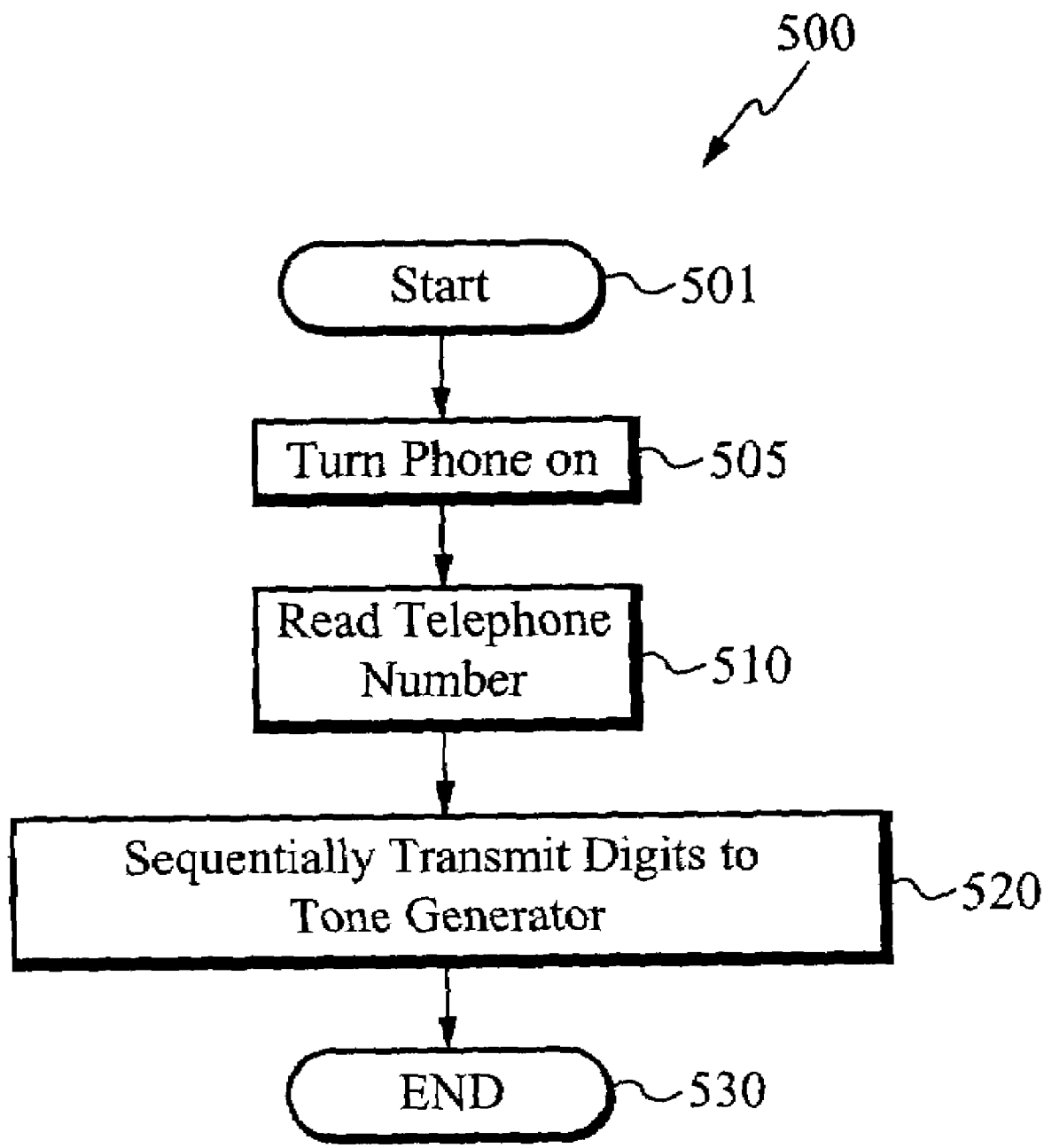
FIG. 5 is a flow chart illustrating the steps executed by a fingerprint control system to perform the task of automatically dialing a telephone number in accordance with one embodiment of the present invention.

FIG. 5 illustrates the steps 500 used to perform the task of automatically dialing (i.e., speed dialing) a telephone number in accordance with the present invention. The steps 500 correspond to the step 330 in FIG. 3. Referring to FIGS. 1 and 2, for this example, it is assumed that the fingerprint image 241 is read by the fingerprint sensor 115. The control program launches the PERL script phone.pls, passing it the parameter "10102504085551212". The PERL script phone.pls then executes the tasks displayed in the steps 500. First, in the start step 501, the fingerprint sensor 115 and any data structures used by the PERL script phone.pls are initialized. Next, in the step 505, the control program turns the electronic device (here, a telephone) ON. Next, in the step 510, phone.pls reads the parameters 246, the sequence of digits "10102504085551212" containing a calling card code and a telephone number. Next, in the step 520, phone.pls sequentially transmits the digits to a tone generator in the telephone, thus automatically dialing the calling card code and the telephone number. Next, in the step 530, the process ends.

Figure 6:
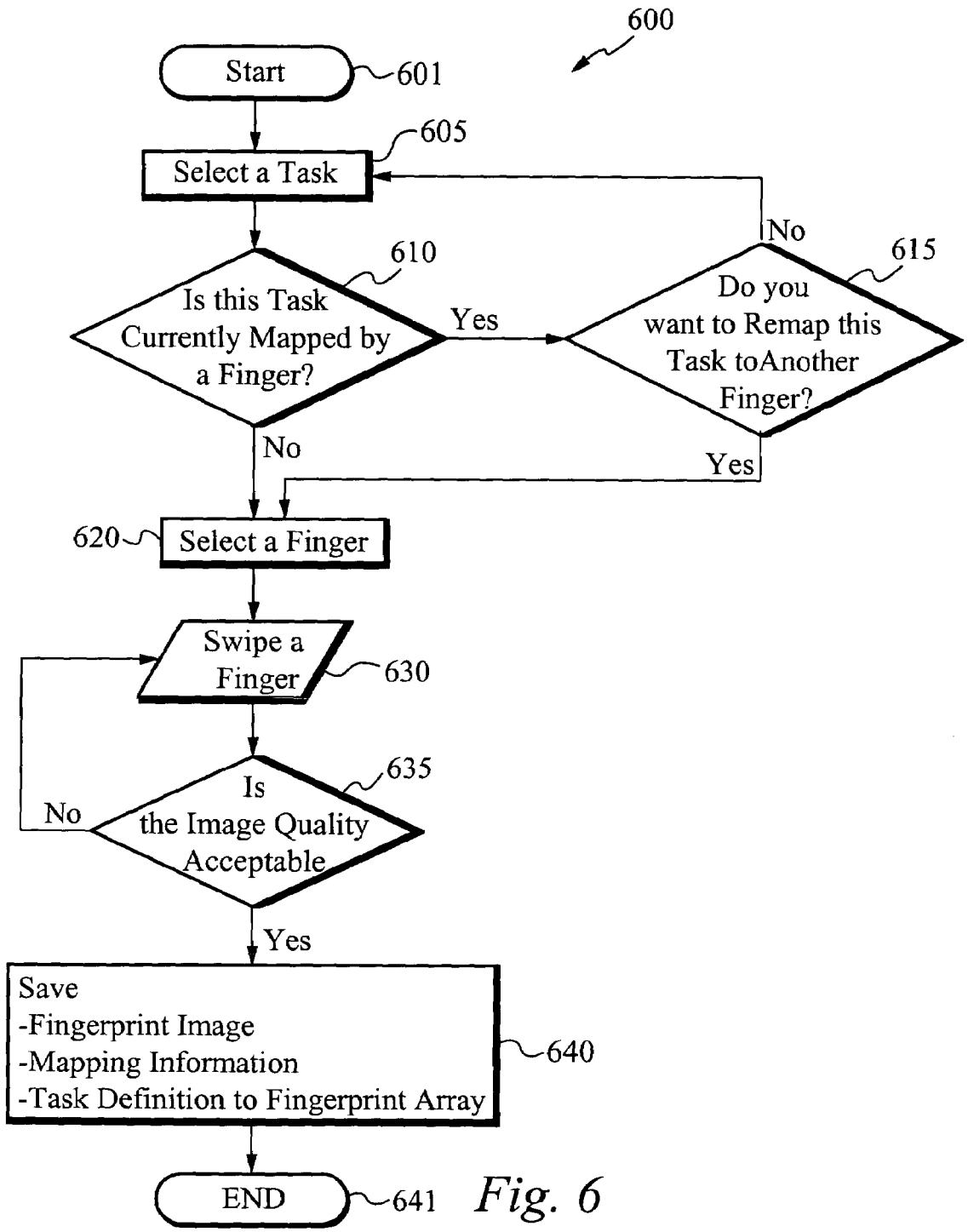
FIG. 6 is a flow chart illustrating the steps used to enroll a fingerprint image in a fingerprint control system and to associate a task with the fingerprint image in accordance with one embodiment of the present invention.

FIG. 6 illustrates the steps 600 performed by an Enrollment Program to store fingerprint images and their associated tasks and parameters in the electronic device 100 (FIG. 1) during a set up process. The Enrollment Program starts in the START step 601. The START step 601 can be entered in a variety of ways, such as by pressing a START button (not shown) on the input device 135 of FIG. 1. Next, in the step 605, the user is prompted to select a task, which in turn can execute a chain of tasks. Tasks can be presented in a number of ways. For example, a user can be presented with a menu of tasks on the display device 130, any number of which can be selected by, for example, entering a selected task on the input device 135. In addition, a user can type in the name of a script (e.g., phone.pls in the array cell 244 of FIG. 2) and its associated parameters (e.g., "10102504085551212" in the array cell 246 in FIG. 2). Next, in the step 610, the Enrollment Program checks whether the selected task has already been associated with a fingerprint image. The Enrollment Program can do this by, for example, parsing the column 204 in FIG. 2 to see whether any of the tasks stored there correspond to the task selected in the step 605. If the selected task corresponds to a fingerprint image in the fingerprint array 200, then the Enrollment Program proceeds to the step 615; otherwise the Enrollment Program proceeds to the step 620.

In the step 615, the Enrollment Program prompts the user whether she would like to change the mapping (association) currently stored in the fingerprint array 200. Preferably, the system of the present invention disallows two fingerprint images from mapping to the same task. It will be appreciated, however, that two fingers can be mapped to the same task. If the user would not like to remap the action already stored in the fingerprint array 200, the Enrollment Program proceeds to the step 605; otherwise, the Enrollment Program proceeds to the step 620. In the step 620, the user is prompted to select a finger that she will later swipe and whose image will be mapped to the selected task. The user can be prompted in a variety of ways. For example, she can be presented with a screen image (similar to column 201 in FIG. 4) of fingers and a means (e.g., mouse click or keypad entry) for selecting one of the fingers presented.

Next, in the step 630, the user swipes (or places) her finger on the fingerprint sensor 115, and in the step 635 the Enrollment Program checks whether the fingerprint image quality is acceptable. It will be appreciated by those skilled in the art that this can be accomplished in many ways, such as by ensuring an adequate number of dark ridges. If the fingerprint image quality is acceptable, the Enrollment Program proceeds to the step 640; otherwise the Enrollment Program proceeds to the step 630. In the step 640, the Enrollment Program stores in the fingerprint array 200 the fingerprint image, its corresponding task, and the task's corresponding parameters. Next, in the step 641, the Enrollment Program ENDs.

Figure 7:
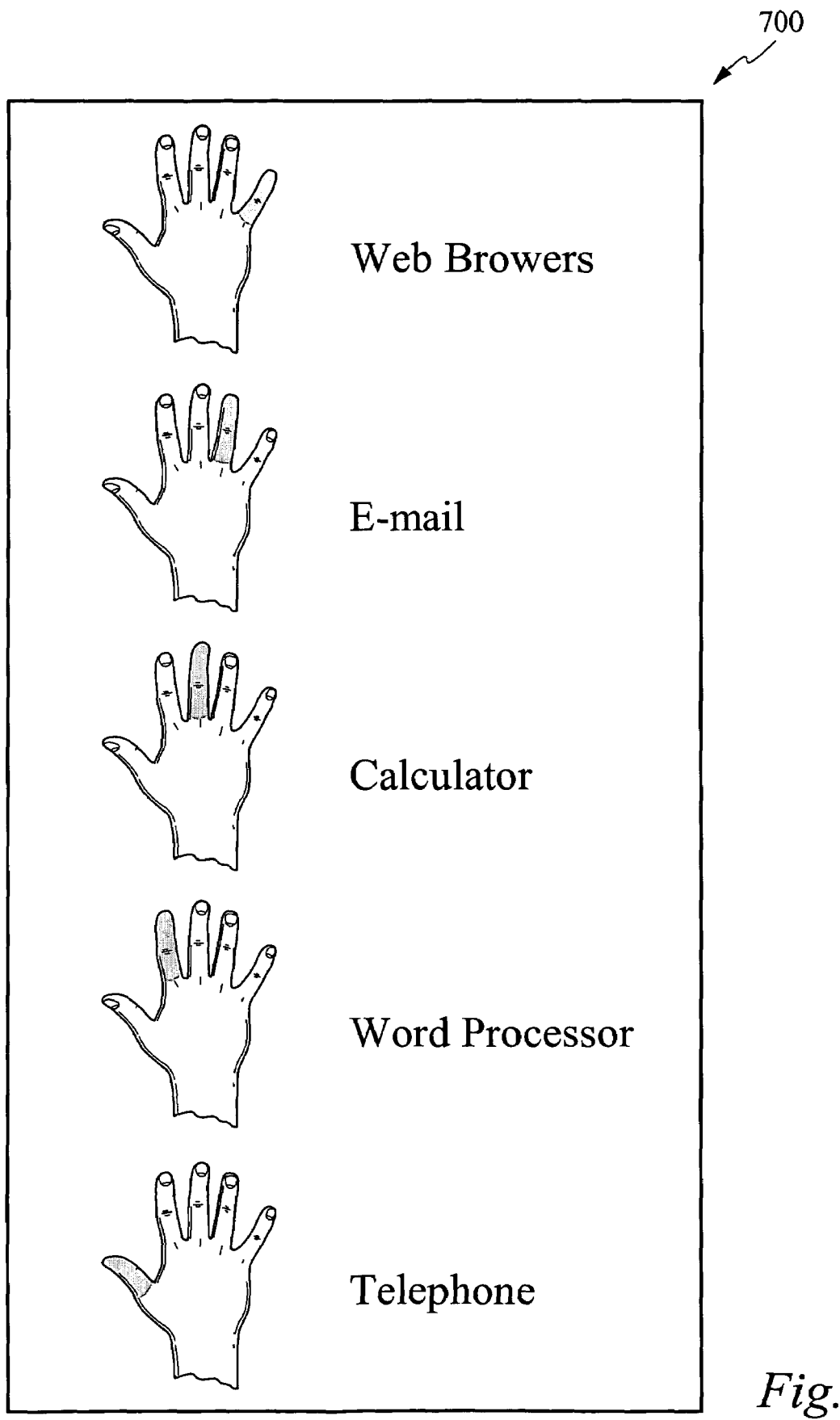
FIG. 7 is a screen shot of a display screen schematically illustrating a plurality of hands each having a highlighted finger and the associated task for each highlighted finger.

FIG. 7 is a screen shot 700 of a display showing the relationship between fingers (and thus fingerprint images) and the corresponding tasks. Embodiments of the present invention can display the screen shot 700 to remind a user of the tasks associated with each finger. For example, referring to FIG. 1, by pressing a button on the input device 135, the screen shot 700 can be displayed on the display unit 130. The screen shot 700 shows that when the user swipes her right pinkie finger on the fingerprint sensor 115, a Web browser is automatically launched; when she swipes her right ring finger, an e-mail program is automatically launched; when she swipes her middle finger, a calculator program is automatically launched; when she swipes her right index finger, a word processor is automatically launched; and when she swipes her right thumb, a telephone number is automatically dialed.

Figure 8:
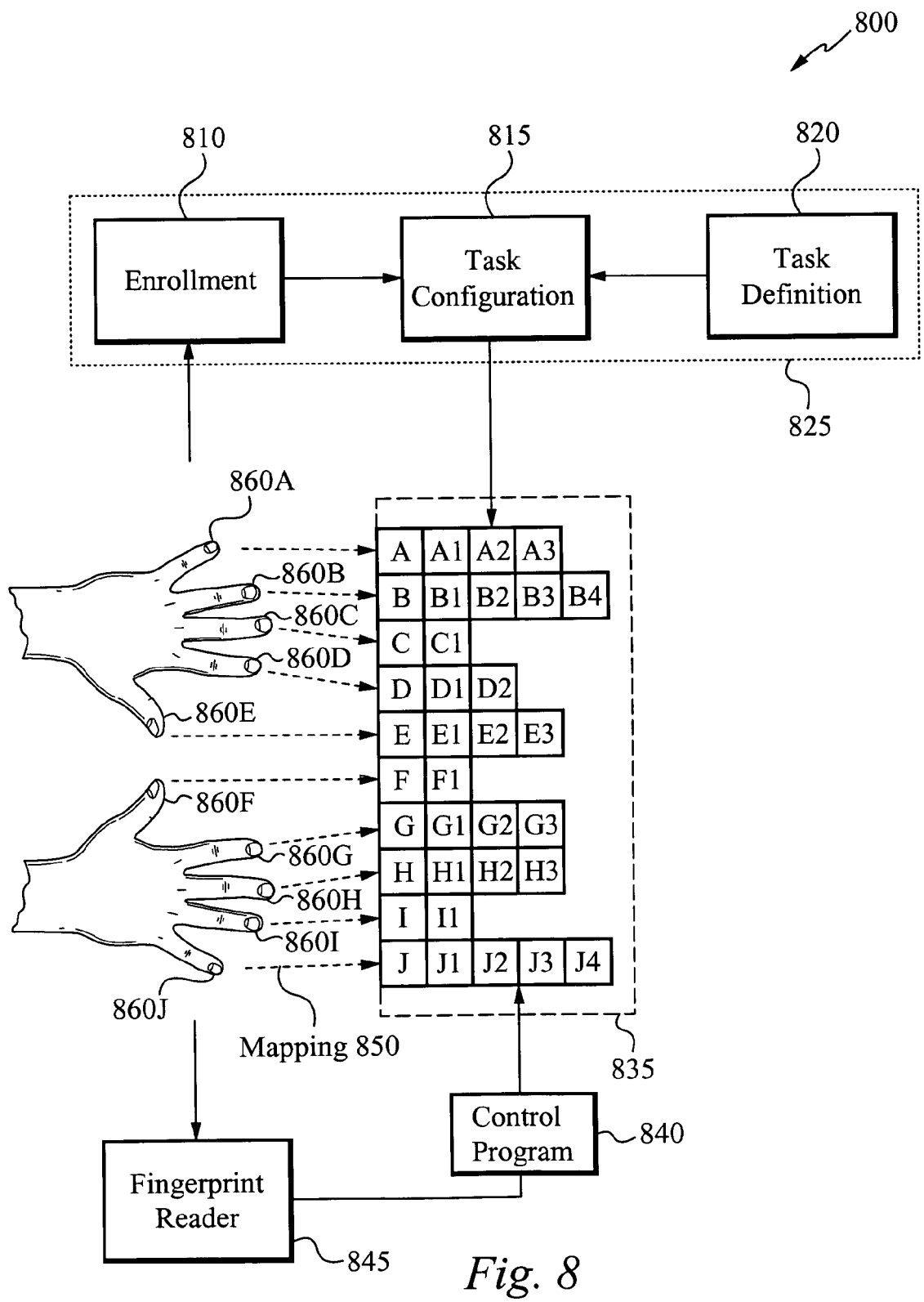
FIG. 8 is a schematic diagram illustrating relationships between engines used to set up and run a fingerprint control system in accordance with the present invention.
Figure 10:
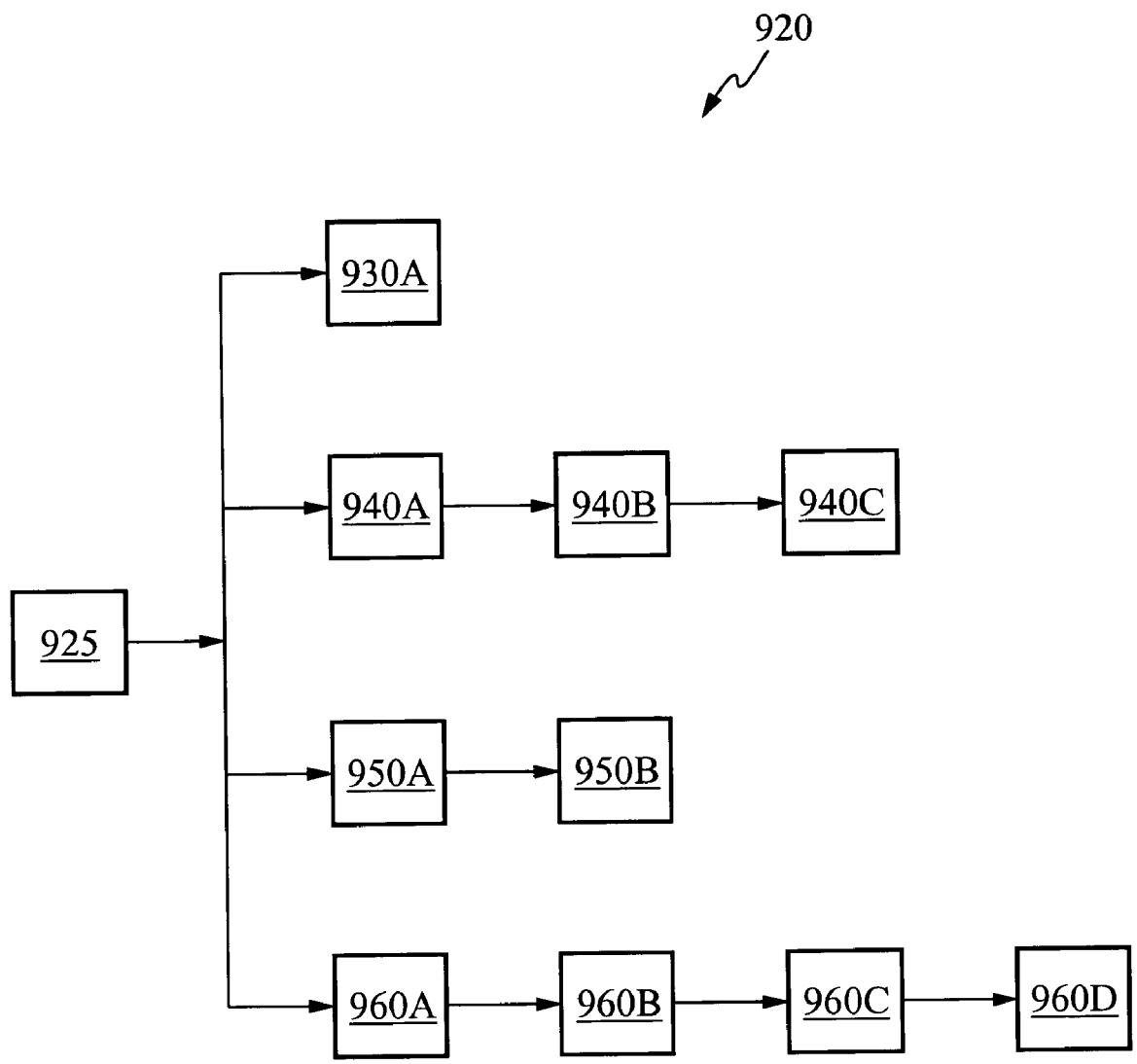
FIG. 10 is a graph showing a parent task that automatically spawns children tasks, each children task in a chain of tasks.

FIG. 8 illustrates the relationship between the elements of a fingerprint control system 800 comprising a fingerprint reader 845, an initialization program 825, a fingerprint array 835, and a control program 840. The initialization program 825 comprises an Enrollment engine 810, a Task Definition engine 820, and a Task Configuration engine 815. The fingerprint array 835 contains a column of 10 fingerprint images labeled A through J (also referred to as row A through row J, respectively). Each fingerprint image has associated with it a task chain. The task chain corresponds to multiple tasks that are executed by the control program 840 when a fingerprint image read by the fingerprint reader 845 matches a fingerprint image stored in the fingerprint array 835. Preferably, read fingerprint data (e.g., minutiae points) are compared to fingerprint data stored in the fingerprint array 835. The row A has associated with it the chain of tasks (e.g., executable files or scripts) A1, A2, and A3. Each task A1, A2, and A3 can have one or more parameters associated with it. The result of each task depends on the values of these parameters. It will also be appreciated that while FIG. 8 shows a linear (one-dimensional) task chain A1, A2, and A3, such that task A1 is performed, followed by task A2 and then task A3, tasks can also be performed in parallel. Thus, for example, when a read fingerprint image matches the fingerprint image A, a first task A1 and a second task A11 (not shown) can be performed in parallel, thus allowing for the performance of tasks in a two-dimensional manner. Thus, in accordance with the present invention, tasks can be performed linearly (e.g., sequentially) and in parallel (e.g., concurrently). It will be appreciated that in accordance with the present invention, tasks can be executed in many dimensions. One such embodiment is illustrated in FIG. 10. It will also be appreciated that a task in a task chain can be performed when called (e.g., launched) by a control program, when called by another task (e.g., program performing a task) in the task chain, or in any other manner.

FIG. 8 also shows two hands having associated fingers and their corresponding fingerprint images 860A through 860J. The fingerprint image corresponding to the finger 860A is stored in the fingerprint array 835 at the location A; the fingerprint image corresponding to the finger 860B is stored in the fingerprint array 835 at the location B; etc.

As shown in FIG. 8, when the user chooses to enroll a fingerprint image into the fingerprint control system 800, the Enrollment engine 810 is executed. The Enrollment engine 810 processes a fingerprint image captured by the fingerprint scanner 845 and passes the fingerprint image, a pointer to a memory location containing the fingerprint image, or any other fingerprint image identifier to the Task Configuration engine 815. A Task Definition (i.e., associated tasks or programs) are then supplied to the Task Definition engine 820. In one embodiment, the user types tasks using the an input device such as the input device 135 shown in FIG. 1. The Task Configuration engine 815 then stores the fingerprint image identifier (e.g., a fingerprint image, fingerprint minutiae points, pointer to fingerprint minutiae points) into the first column of a row in the Fingerprint Array 835 (e.g. A) and then stores the task chain (e.g., action sequence) and their associated parameters in the remaining elements in the row (e.g., A1, A2, and A3).

It will be appreciated that a fingerprint image can have any number of tasks in its respective task chain. Thus, for example, the fingerprint image B has four tasks B1-B4 in its task chain; the fingerprint image C has one task C1 in its task chain; etc. Each task in a task chain has any number of optional parameters. Parameters can include those used to perform a task (e.g., execute a program) regardless of the fingerprint data that are matched, or those used when particular fingerprint data are read (e.g., user profile data), or any combination of these.

In one embodiment, the fingerprint array 835 and the initialization program 825 can both reside in a single memory storage, such as the storage 120 in FIG. 1. It will be appreciated, however, that the fingerprint array 835 and the initialization program 825 can reside on different storage devices at different locations. For example, the initialization program 825 can reside on an electronic device (not shown) and the fingerprint array 835 can be coupled to the electronic device over a network. The initialization program 825 is not required after the set up process. In one embodiment, fingerprint images are stored on a storage device in encrypted form, thus adding an additional level of security.

It will be appreciated that other modifications can be made to this embodiment in accordance with the present invention. For example, the read fingerprint can be compared to decoded stored fingerprint images, though such a modification will require multiple decryptions and thus may take longer.

Embodiments of the present invention can be used to launch any number of tasks. For example, if the electronic device (e.g., platform) is a personal computer, the left index finger can launch a browser and bring up a web site, while the right middle finger can launch an email program. If the platform is a mobile phone, the middle finger can trigger the phone to speed dial the home phone number of the user. If the platform is a game device, the thumb can launch a particular game to play on the game device. If the platform is a television remote control, the index finger can launch a program to switch to a parent-controlled channel while the last finger will turn off the television. If the platform is an automatic coffee maker, the right thumb can perform the inherent function of turning the automatic coffee maker ON and then launch a program that causes the coffee maker to brew a cup of cappuccino; if the right index finger is swiped, the program can direct the coffee maker to prepares a cup of mocha. If the platform is a MP3 player, swiping the right index finger will direct the MP3 player to play the second song on a disc. If an electronic device is part of a high security environment, a user will normally swipe his left index finger to pass a security checkpoint. If he is under duress or danger, he will swipe his left middle finger to pass the security checkpoint and also indicate a potential danger. In sum, any number of electronic devices can be controlled with embodiments of the present invention.

It will be appreciated that the present invention is independent of device types and operating systems. It can work with all types of fingerprint authentication solutions and all types of finger image sensors (e.g. capacitive, optical, thermal, pressure, etc.), swipe or placement. The present invention can also be executed in specialized hardware or firmware instead of in software. Tasks or parts of a task can be implemented in software while other portions are implemented in firmware, hardware, software, or any combination of these.

Figure 9:
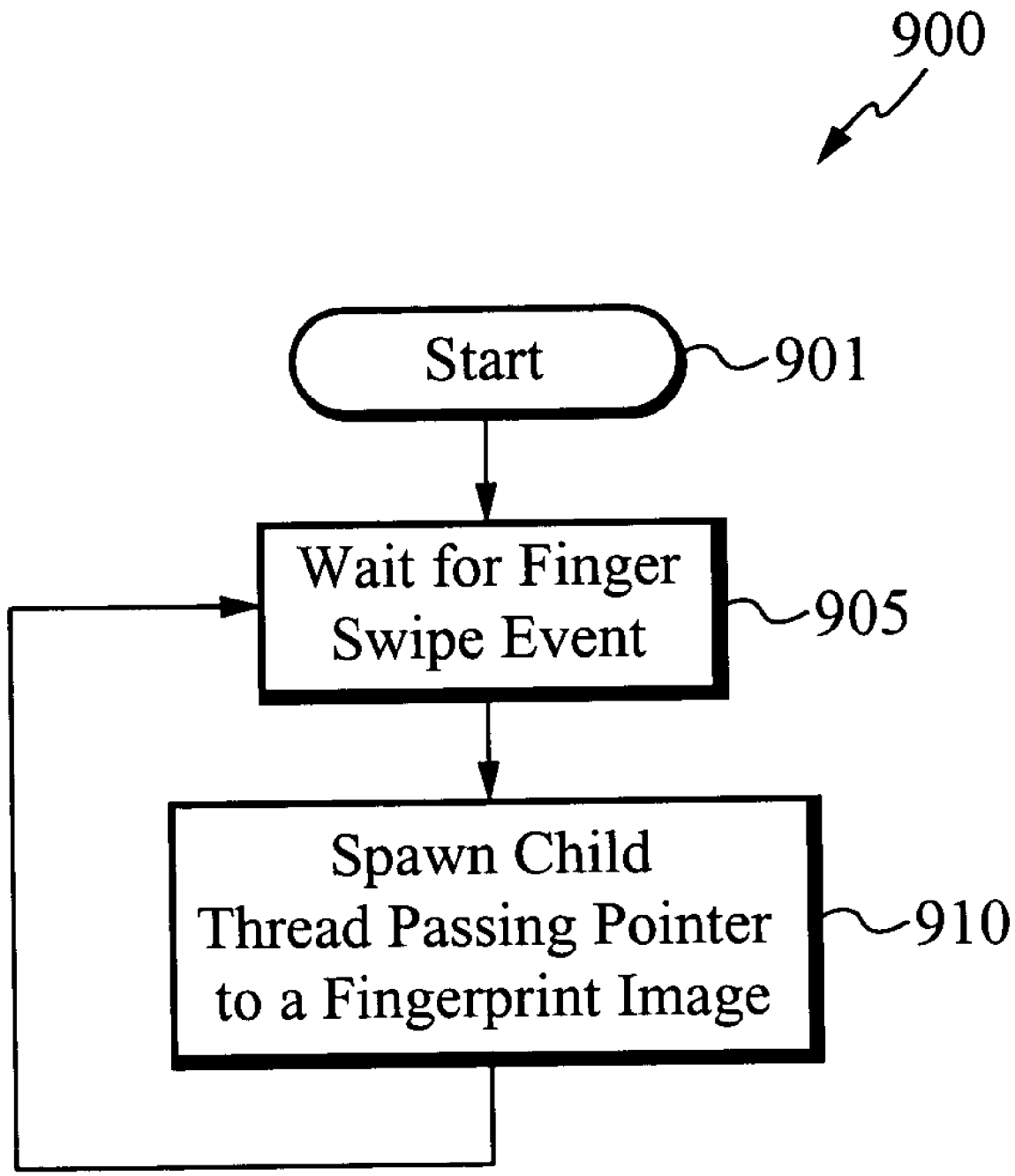
FIG. 9 is a flow chart illustrating the steps used to spawn child processes so that multiple tasks can be performed concurrently.

The control program can launch multiple tasks that run concurrently. FIG. 9 illustrates the steps 900 taken by a parent program (e.g., process) in accordance with one embodiment of the present invention. First, in the step 901, the parent program initializes any parameters used to control the multiple processes, such as process identifiers (PIDs). Next, in the step 901, the parent program waits for a finger swipe on a fingerprint sensor. The parent program can, for example, wait for a swipe event, be interrupted as part of an interrupt service routine triggered when a finger is swiped on a fingerprint sensor, or triggered in other ways. Next, in the step 910, the parent program spawns a child process or thread, passing it the fingerprint image identifier, such as a fingerprint image or the address of a memory location containing the fingerprint image. The child process then performs the tasks associated with the fingerprint image, as illustrated, for example, in the steps 300 of FIG. 3. The parent program then loops back to the step 905. Thus, in a windows environment, multiple windows for multiple tasks can be open at once in accordance with the present invention. It will be appreciated that the parent program will perform other steps to perform steps of the present invention.

FIG. 10 shows a graph 920 illustrating how one task can automatically launch a plurality of tasks, each task being a part of a task chain, in accordance with one embodiment of the present invention. Thus, for example, when read fingerprint data corresponds to stored fingerprint data having an associated task 925, the associated task 925 launches the tasks (also referred to as sub tasks) 930A, 940A, 950A, and 960A. Each task 930A, 940A, 950A, and 960A can have any number of associated parameters (e.g., user profile data) that can be dependent on the stored fingerprint data. Thus, in one embodiment, the task 930A can have a first element that corresponds to a script (e.g., 214 in FIG. 2) and a second element that corresponds to the parameters used by the script (e.g., 216 in FIG. 2). For the embodiment shown in FIG. 10, the tasks 930A, 940A, 950A, and 960A are launched concurrently and can execute in parallel.

Still referring to FIG. 10, the task 940A in turn calls the task 940B, which in turn calls the task 940C. The tasks 940B and 940C also both have optional parameters. The task 940A can call the task 940B just before the task 940A completes so that the tasks 940A and 940B are not executing in parallel. Alternatively, the task 940A can call the task 940B at another time, so that the tasks are executing in parallel. The tasks 940A and 940B, as well as the other tasks illustrated in FIG. 10, can also be coordinated so that they can share data. For example, the task 940A can read stock data on a Web page, and then pass the stock data to the task 940B, which includes the data in an e-mail to a user, thereby notifying the user of changes in stock prices. In a similar manner, the task 950A calls the task 950B. The task 960A calls the task 960B, which calls the task 960C, which calls the task 960D.

The tasks 925 and 930A are said to form a first task chain, the tasks 925, 940A, 940B, and 940C are said to form a second task chain, the tasks 925, 950A, and 950B are said to form a third task chain, and the tasks 925, 960A, 960B, 960C, and 960D are said to form a fourth task chain. It will be appreciated that one or more of the tasks (e.g., 930A, 950A-C, 940A-B, and 960A-D) can each be a parent task, launching one or more parallel tasks such as done by 925. In this way, an n-dimensional chain can be formed with concurrently executing tasks.

Multiple users may share the electronic device 100 of FIG. 1. In such case, the electronic device 100 can have separate profiles for each user. Each profile will consist of the enrolled fingerprint data (e.g., minutiae points) and the mapping information (e.g., associated tasks and their parameters) of the user. Different users enroll their fingers and associated tasks and parameters. Since fingerprint authentication is technically reliable, a fingerprint image from a user will not trigger the performance of a task associated with the fingerprint image of another user. It will be appreciated that the fingerprint array 200 can hold fingerprint images from one person or more than one person. Thus, multiple persons can use a single fingerprint control system in accordance with the present invention, with each person's fingerprints mapping to particular tasks. Thus, one person's right index fingerprint image can map to the task of opening a Web browser and a second person's right index fingerprint image can map to the task of automatically logging in to the second person's e-mail account.

It will be appreciated that fingerprint data do not have to be stored in user profiles. In an alternative embodiment, fingerprint images of all users are stored together in a single file.

When more than one user has fingerprint images enrolled in a fingerprint control system, one or more fingerprint arrays can be used to store fingerprint images and their mapping information, the associated tasks and parameters. In one embodiment, each user each has a corresponding fingerprint array. When a user first swipes his finger on the fingerprint reader, all subsequent fingerprint images (until he logs out) are compared to fingerprint images stored in that user's corresponding fingerprint array. When a second user logs in to the fingerprint control system, all subsequent fingerprint images (until she logs out) are compared to fingerprint images stored in her corresponding fingerprint array. In this embodiment, fewer fingerprint images (e.g., entries in the fingerprint array) must be compared before finding the best match.

In a second embodiment, all of the fingerprint images are stored in a single fingerprint array. In this embodiment, users do not have to log in and out. Instead, when a finger is swiped, the captured fingerprint image is compared against all of the fingerprint images in the single fingerprint array to determine the best match. It will be appreciated that other methods and structures for storing and comparing fingerprint images can be used in accordance with the present invention.

In one embodiment of the present invention, ten tasks can be performed by a single user, one for each finger. Another embodiment expands the number of action sequences by mapping permutations of fingerprint images. If two fingerprint images are required to start an action sequence, then the maximum number of tasks that can be performed is $10^2$ or 100. The two images may come from the same finger or different fingers of the same person. For example, a user may define the sequence of fingerprint images for her left small finger followed by her right small finger to map to the action sequence that turns OFF the electronic device. The associated tasks will be appropriately mapped to allow users to link and map multiple finger images to an action sequence. In general, the number of action sequence equals ion, where n is the required number of finger images to start a task.

It will be appreciated that in accordance with the present invention, tasks can be nested using combinations or permutations of fingerprint images to perform a particular task. Thus, for example, a fingerprint control system in accordance with the present invention can associate the combination of swiping the user's ring finger followed by the swiping of her thumb to perform a certain task. The combination of the ring finger and the thumb, in any order, can thus be used to perform the task. Alternatively, the fingerprint control system can associate permutations of finger swipes to unique tasks. Thus, the swiping of a ring finger followed by a thumb can associate with (e.g., trigger) one task, but the swiping of a thumb followed by a ring finger can associate with a second task, different from the first. It will be appreciated that any level of nesting can be used.

In another embodiment, requiring that multiple people authorize a particular task, at least one fingerprint image from two or more people can be required. Thus, for example, a task will be performed only if a first person swipes her thumb on a fingerprint sensor and then a second person swipes his index finger on the fingerprint sensor. In this way, an added level of security is added.

In accordance with another embodiment of the present invention, a fingerprint sensor is configured to detect the direction of a fingerprint swipe. Most swipe sensors require that a finger be swiped in a direction perpendicular to the length of the swipe sensor surface. The swipe sensor can capture fingerprint images in either swipe direction, and can tell which direction a finger has been swiped. Using a direction sensitive swipe sensor, a finger can map to two different tasks or action sequences, depending on the swipe direction, thus increasing the number of tasks that can be mapped to a user's set of fingerprint images. Thus, since a single fingerprint image can map to two tasks, depending on the swipe direction, two fingerprint images can map to four tasks. Ten fingerprint images can map to twenty tasks.

In accordance with another embodiment of the present invention, the same fingerprint image is mapped to different tasks based upon the context. For example, on a personal computer, the context can be defined as the application that is currently active and occupying the Desktop. Thus, a fingerprint image read when a text editor is active may launch the task of adding a signature at the cursor, but the same fingerprint image read while a financial software application is running may launch the task of authorizing a transaction. As a second example, when the left index finger is detected, a mobile phone program can be launched to automatically dial the corresponding phone number. However, after the call is connected, detecting the same fingerprint image will emit a series of DTMF tones that represent the calling card numbers. It will be appreciated that in this embodiment, the electronic device must support at least two contexts.

In accordance with another embodiment of the present invention, swiping a finger launches the combined tasks of granting a user access to the electronic device but also launches another application program. Thus, for example, a user who is computer illiterate or unable to type can start a computer and launch different applications depending on which finger is used for authentication. The user may use her left index finger to start a computer with a browser pointing to the news, or she may use her right thumb to open the same computer and start with online radio. Thus, each fingerprint image corresponds to a separate start-up profile of the user.

It will be readily apparent to one skilled in the art that various modifications may be made to the embodiments without departing from the spirit and scope of the invention as defined by the appended claims.

We claim:

1. An electronic device comprising:

a housing;

a finger biometric sensor carried by said housing; and a central processing unit and a mapping storage unit cooperating therewith and carried by said housing for mapping a plurality of different tasks associated with different fingers of a user;

said central processing unit and said mapping storage unit being configured to perform a user authentication based upon said finger biometric sensor sensing an enrolled finger of the user;

said central processing unit and a mapping storage unit being further configured to perform, after the user authentication, a sequence of nested subtasks for a given task from among the plurality thereof based upon said finger biometric sensor sensing the corresponding finger of the user, each of the nested subtasks in the sequence being different.

2. The electronic device according to claim 1 wherein the plurality of different tasks comprises a plurality different Website launches.

3. The electronic device according to claim 1 wherein the plurality of different tasks comprises at least one email application.

4. The electronic device according to claim 1 wherein the plurality of different tasks comprises at least one word processing application.

5. The electronic device according to claim 1 wherein the plurality of different tasks comprises at least one telephone application.

6. The electronic device according to claim 1 wherein said central processing and said mapping storage unit map the plurality of different tasks associated with different combinations of fingers of the user.

7. The electronic device according to claim 1 further comprising a wireless transceiver carried by said housing and coupled to said central processing unit for external communication.

8. The electronic device according to claim 1 wherein said finger biometric sensor comprises a sweep fingerprint sensor.

9. The electronic device according to claim 1 wherein said finger biometric sensor comprises a placement fingerprint sensor.

10. The electronic device according to claim 1 wherein said finger biometric sensor comprises an integrated circuit fingerprint sensor.

11. A method for operating an electronic device comprising a housing, a finger biometric sensor carried by the housing, and a central processing unit and a mapping storage unit cooperating therewith and carried by the housing, the method comprising:

mapping a plurality of different tasks associated with different fingers of a user using the central processing unit and mapping storage unit;

using the central processing unit and the map in storage unit for performing a user authentication based upon the finger biometric sensor sensing an enrolled finger of the user; and using the central processing unit to perform, after the user authentication, a sequence of nested subtasks for a given task from among the plurality thereof based upon the finger biometric sensor sensing the corresponding finger of the user, each of the nested subtasks in the sequence being different.

12. The method according to claim 11 wherein the plurality of different tasks comprises a plurality different Website launches.

13. The method according to claim 11 wherein the finger biometric sensor comprises an integrated circuit fingerprint sensor.

* * * * *

UNITED STATES PATENT AND TRADEMARK OFFICE
CERTIFICATE OF CORRECTION

Page 1 of 2

PATENT NO. : 7,697,729 B2
APPLICATION NO. : 10/882787
DATED : April 13, 2010
INVENTOR(S) : Howell et al.

It is certified that error appears in the above-identified patent and that said Letters Patent is hereby corrected as shown below:

In the Drawings    Delete: "FIG. 7"
Insert: New FIG. 7

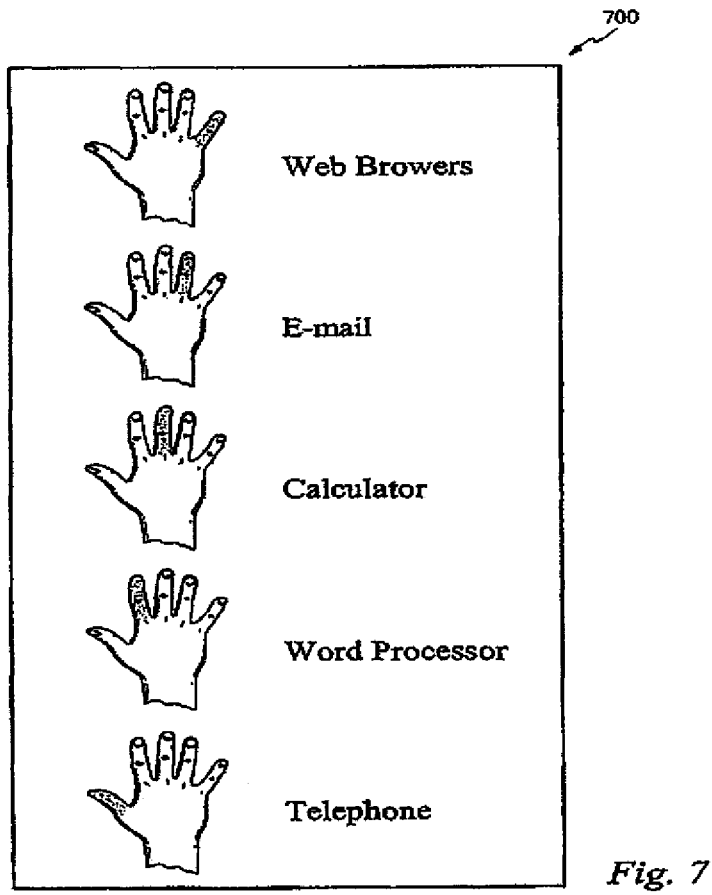

*Fig. 7*

Column 6, Line 15    Delete: "an"
Insert: --a--

Signed and Sealed this
Twentieth Day of March, 2012

David J. Kappos
*Director of the United States Patent and Trademark Office*

CERTIFICATE OF CORRECTION (continued)
U.S. Pat. No. 7,697,729 B2

| | |
|---|---|
| Column 6, Line 63 | Delete: "are" <br> Insert: --art-- |
| Column 8, Line 62 | Delete: "on" <br> Insert: --an-- |
| Column 9, Line 45 | Delete: "is" <br> Insert: --are-- |
| Column 12, Line 41 | Delete: "the" |
| Column 15, Line 1 | Delete: "each" |
| Column 15, Line 52 | Delete: "sequence" <br> Insert: --sequences-- |
| Column 15, Line 52 | Delete: "ion" <br> Insert: --$10^n$-- |
| Column 16, Line 57 | Insert: --of-- |
| Column 18, Line 4 | Delete: "map in" <br> Insert: --mapping-- |
| Column 18, Line 15 | Insert: --of-- |